W. VAN E. THOMPSON.
LIMB SUPPORT.
APPLICATION FILED MAR. 5, 1919.
1,355,579.
Patented Oct. 12, 1920.
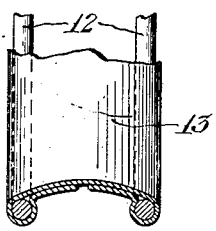
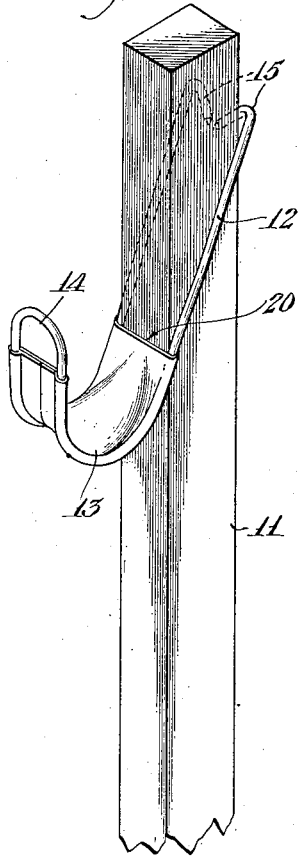
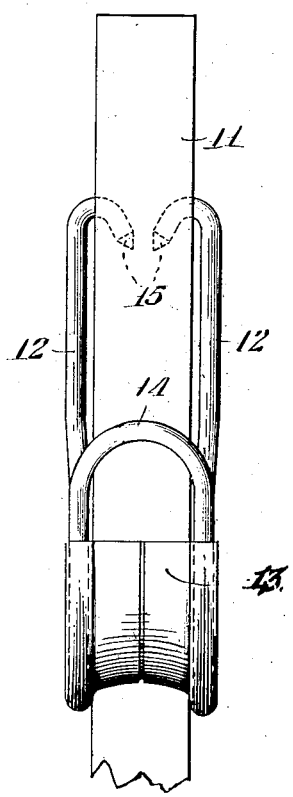
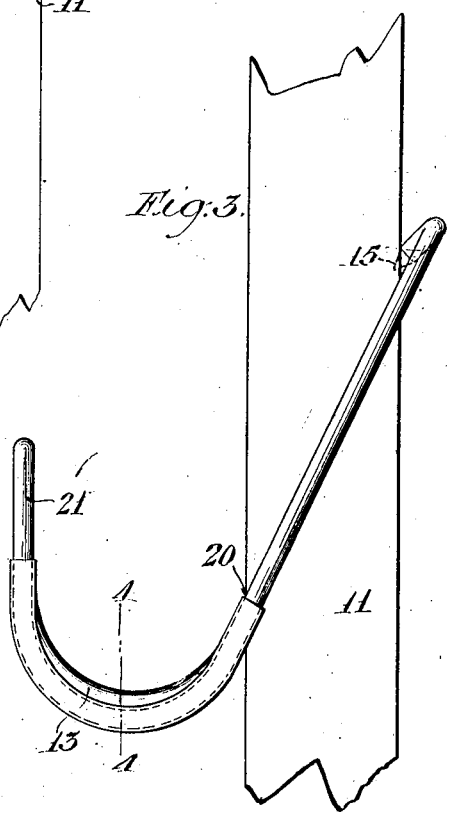
Inventor
Walter Van E. Thompson
Graham & Harris
Attorneys

UNITED STATES PATENT OFFICE.

WALTER VAN E. THOMPSON, OF LOS ANGELES, CALIFORNIA, ASSIGNOR TO ANNA G. WALTERS, OF LAGUNA, CALIFORNIA.

LIMB-SUPPORT.

1,355,579.   Specification of Letters Patent.   Patented Oct. 12, 1920.

Application filed March 5, 1919. Serial No. 280,870.

*To all whom it may concern:*

Be it known that I, WALTER VAN E. THOMPSON, a citizen of the United States, residing at Los Angeles, in the county of Los Angeles and State of California, have invented a new and useful Limb-Support, of which the following is a specification.

My invention relates to limb supports such as are utilized to support the limbs of fruit trees from wooden props which are provided in the tree for that purpose.

The object of the invention is to provide a limb support which may be attached to the prop at any portion throughout its length and which will be so designed that it will not injure the bark of the limb which is supported therein.

In my invention I utilize the wire member and a sheet metal member, but I combine them in a novel manner with certain novel results as will hereinafter be set forth.

Referring to the drawings, which are for illustrative purposes only,

Figure 1 is a perspective view of a prop equipped with my invention.

Fig. 2 is a front view of the prop on an enlarged scale.

Fig. 3 is a similar side view.

Fig. 4 is a section on a plane represented by the line 4—4 of Fig. 3.

In the form of the invention illustrated in these drawings, 11 is the prop which is formed of a rectangular piece of wood approximately 1¼ inches wide and ⅞ of an inch thick, this being a convenient size to cut from standard dimension lumber. The limb support consists of a wire member 12 and a sheet metal member 13. The wire member 12 consists of two parallel limbs united by a bend 14, each of these limbs terminating in a prong 15 which is provided with a sharp point. The limbs 12 are substantially parallel and are bent to form a cradle for the limb, being covered with the metal member 13 which consists of a flat sheet bent over approximately as shown in Fig. 4. The top of the member 13 is convex on its upper surface so that the limb resting therein is supported on a very wide surface of sloping contour, there being no sharp edges to rub upon and injure the bark of the limb.

It is necessary in the successful management of large orchards, particularly orchards in which citrus fruits are grown, to support the limbs of the trees very thoroughly and large numbers of limb supports are so used. The limb support of Woodward has met with wide favor due to the cheapness of construction, but it is objectionable in that it wears the limbs. The limb support of Walters partially overcomes this difficulty but the cost of manufacture makes its practical exploitation prohibitive. My invention is designed to produce a limb support which will be little, if any, more expensive than that of Woodward and which at the same time will have all and some added advantages over the invention of Walters.

It will be noted that when the limb support is in place on the prop 11 that the sheet metal member 13 makes a very close juncture with the prop 11 as shown at 20, and it will further be noted that the portions of the limbs 12 immediately adjacent to the bend 14 as shown at 21 in Fig. 3 are approximately parallel with the prop 11. These are important features of construction as they tend to prevent injury to the limb and to securely retain it in place. It is understood that any prop 11 may have a plurality of limb supports secured thereon.

What I claim is:—

1. A limb support comprising a wire member having a central bend forming two parallel limbs sufficiently separated to receive a prop therebetween, a prong formed on the end of each limb directed toward the central bend and arranged to enter the prop, and a sheet metal member completely encircling both of said limbs engaging the prop at one end, said limbs and sheet metal member being bent to form a cradle in which the limb of the tree can lie.

2. A limb support comprising a wire member having a central bend forming two parallel limbs sufficiently separated to receive a prop therebetween, two prongs arranged to enter the prop, each prong formed on the end of one of said limbs, and a sheet metal member completely encircling both of said limbs arranged to engage the prop at one end, said limbs and sheet metal member being bent to form a cradle in which the limb of the tree can lie, and said sheet metal member forming a convex surface on which said limb can rest.

In testimony whereof, I have hereunto set my hand at Los Angeles, California, this 27th day of February, 1919.

WALTER VAN E. THOMPSON.